J. H. MUMMA.
Broom Attachment.
No. 51,074.
Patented Nov. 21, 1865.
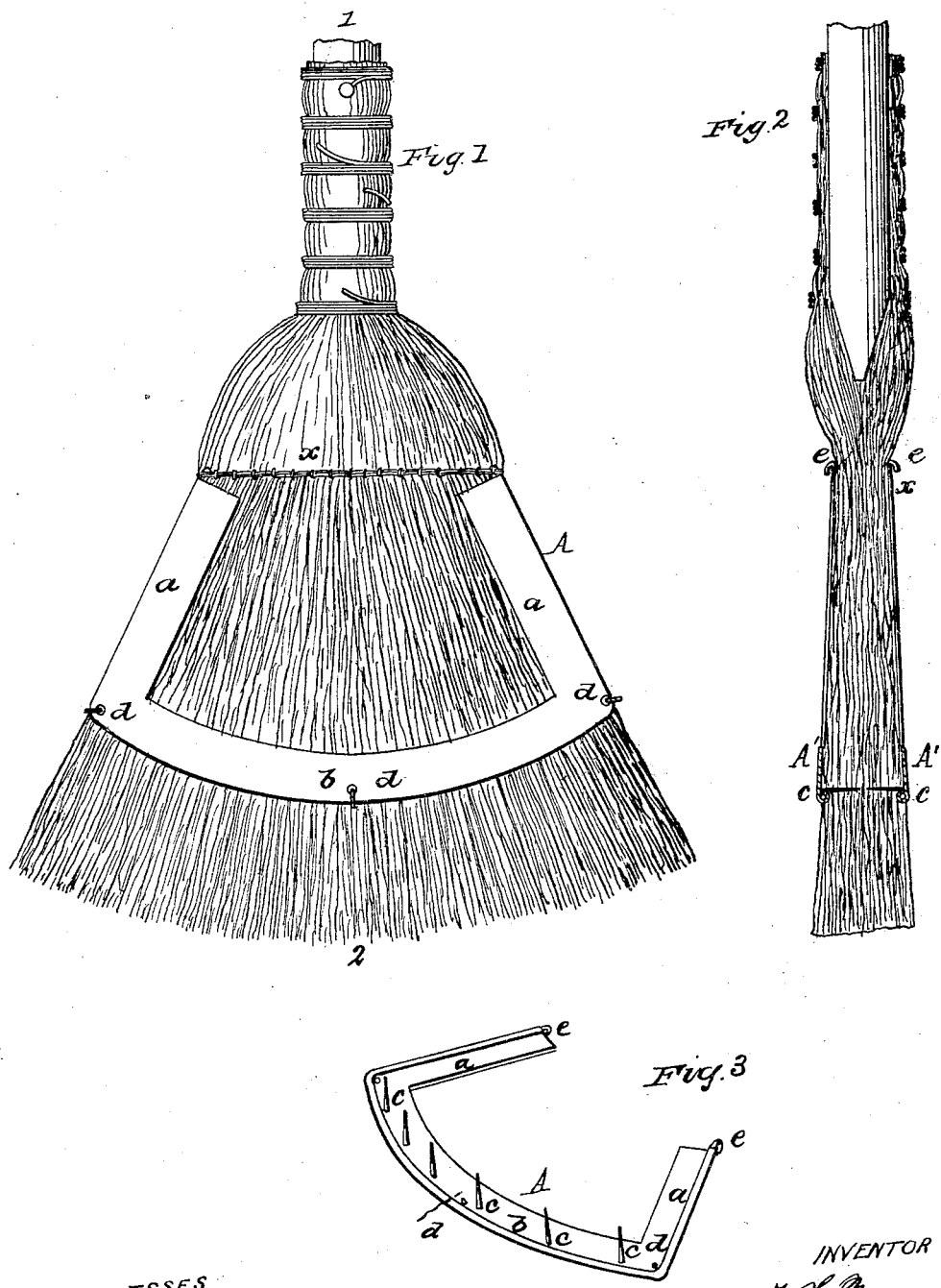

UNITED STATES PATENT OFFICE.

JACOB H. MUMMA, OF HARRISBURG, PENNSYLVANIA.

ATTACHMENT FOR BROOMS.

Specification forming part of Letters Patent No. 51,074, dated November 21, 1865.

*To all whom it may concern:*

Be it known that I, JACOB H. MUMMA, of Harrisburg, Dauphin county, Pennsylvania, have invented an Attachment for Brooms; and I do hereby declare the following to be a full, clear, and exact description of the same, reference being had to the accompanying drawings, and to the letters of reference marked thereon.

My invention consists of certain detachable plates, between which the stalks or fibers composing the broom are confined near their lower ends, so that the broom shall always have an elastic and uniform edge.

In order to enable others to make and use my invention, I will now proceed to describe the manner in which the same is carried into effect.

On reference to the accompanying drawings, which form a part of this specification, Figure 1 is a front view of a broom with my improvement; Fig. 2, a section on the line 1 2, Fig. 1; Fig. 3, a perspective view of one of the plates of the attachment.

It is well known that after a broom constructed in the ordinary manner has been used for a short time the stalks or fibers begin to separate from each other at the lower ends and become bent or broken, so that before the broom is half-worn away it loses at the lower end the compactness, elasticity, and regularity of an efficient broom.

In order that the stalks may always be maintained in the position in which they are first arranged, I use two plates, A A', each of which consists of two strips, $a\ a$, connected together by and forming a part of a curved cross-piece, $b$. From the inner side of the cross-piece project pins $c\ c$. Near the edge are openings $d\ d$, and at the ends of each strip $a$ is a hook, $e$.

When the attachment has to be applied to a broom, D, the stalks of which are bound together by the usual cord, $x$, the plate A is applied to one side of the broom, its pins $c\ c$ projecting inward, and each hook $e$ is passed beneath the cord $x$ near one edge of the broom, the plate A' being applied to the opposite side in a similar manner. The plates are then secured firmly together and against the sides of the broom by cords or wires passed from one plate to the other through the openings $d$.

It will be seen that the stalks are held firmly between the plates and between the pins $c\ c$, in the position in which they were first arranged, their lower ends being retained close together as long as the plates are used, and the elasticity and uniformity of the lower edge of the broom are thus preserved.

When the broom wears away the plates may be removed, and if the stalks still project such a distance beyond the cord $x$ as not to be sufficiently supported by the latter, other plates A A', with shorter strips $a\ a$, may be substituted for those removed.

It will be apparent that the form of the plates A A' and the mode of securing them to the broom may be varied without departing from the main features of my invention. I therefore do not desire to confine myself to the precise form of plates herein described; but

I claim as my invention and desire to secure by Letters Patent—

The plates A A', with their hooks $e\ e'$, or their equivalents, constructed and adapted for attachment to the cord $x$ or equivalent device for securing together the stalks of a broom, all substantially as and for the purpose specified.

In testimony whereof I have signed my name to this specification in the presence of two subscribing witnesses.

J. H. MUMMA.

Witnesses:
 CHARLES E. FOSTER,
 C. B. PRICE.